United States Patent Office 3,534,147
Patented Oct. 13, 1970

3,534,147
PRINTED WIRING MEANS HAVING A FLAME
RETARDANT CONSTITUENT
Francis H. Bratton, Herbert J. Fick, and Edward J.
Mahagnoul, Northfield, Minn., assignors to G. T.
Schjeldahl Company, Northfield, Minn., a corporation
of Minnesota
No Drawing. Filed Mar. 7, 1966, Ser. No. 532,098
Int. Cl. H05k 1/00
U.S. 174—68.5                                       6 Claims

ABSTRACT OF THE DISCLOSURE

Printed wiring comprising an insulating substrate having a layer of a conductive material arranged in a circuitry pattern and being bonded to a major surface of the insulating substrate by means of a film of flame retardant adhesive, the adhesive film comprising a polyester resinous adhesive constituent and a flame retardant constituent, the flame retardant constituent consisting essentially of a combination of antimony trioxide with a chlorine donor, the antimony trioxide being from about ⅓ to ¼ of the flame retardant constituent, the chlorine donor being the balance. The chlorine donor is selected from the group consisting of perchloropentacyclodecane and a highly chlorinated paraffin containing between about 60% and 70% of reactive chlorine and having an average chain length of from between about 16 carbon atoms and 50 carbon atoms. The flame retardant constituent is included in the adhesive in an amount preferably equal to from between about 22% and up to about 50% by weight.

---

The present invention relates generally to an improved electrical laminate, and more specifically to an improved electrical laminate having flame retardant properties. The concept of the present invention utilizes an adhesive bonding material which is employed to bond the conductive metal, such as, for example, copper or aluminum to an insulating substrate member. The substrate may be prepared from a number of materials; however, the concept has proven to be most significantly shown in connection with an insulating substrate or polyethyleneterephthalate.

In the preparation of the electrical laminates, particularly those laminates which utilize a relatively thin film of an insulating substrate together with a layer of a metal such as copper or aluminum superimposed thereon, it has been found that such a laminate having between about 30% and 60% of its area covered with a conductive material such as copper or aluminum, poses a serious fire hazard. Lower percentages of the metal are not generally as hazardous since the heat transferring capability of the lower quantity of metal substantially diminishes the ability of the material to spread flame. On the other hand, a greater portion of metal will provide a sufficiently large heat sink so as to substantially diminish the transfer of concentrated thermal energy from one point to another along the laminate structure. However, between these limits the flame and fire hazard is considerable and substantial.

The need for a flame retardant substance is therefore apparent. One manner in which flame retardants can be built into a liminate is to utilize a flame retardant material in the adhesive which is used to bond the conductor to the substrate. Generally speaking, it has been found that certain materials which are known for their flame retardant characteristics have a deleterious effect on the bonding strength, the electrical properties, or some other feature of the finished product. In accordance with the present invention, however, it has been found that a mixture of antimony trioxide ($Sb_2O_3$), together with a chlorine donor selected from the group consisting of perchloropentacyclodecane and a highly chlorinated paraffin having an average molecular weight of generally between about 16 and 40 C atoms may be used as a flame retardant material. This material is useful, particularly in the range of between about 22% and about 50% of the solids present in the adhesive mixture. In this arrangement, the antimony trioxide will generally comprise between about 25% and 35% by weight of the flame retardant substance. This particular mixture of flame retardant materials provides a synergistic effect to the flame retardant characteristics of the substance, such as by the generation of antimony oxychloride during the burning process. The availability of antimony oxychloride is generally acknowledged as substantially diminishing the ability of a flame to be maintained.

In addition to these features, it has been further found that the drip-flame capability of the material is substantially diminished when prepared in accordance with the teachings of the present invention.

It is therefore an object of the present invention to provide an improved electrical laminate which is substantially incapable of maintaining vigorous combustion.

It is a further object of the present invention to provide an improved electrical laminate which presents no significant fire hazard when thin films of copper and polyethyleneterephthalate are bonded together and wherein the copper comprises between about 30% and 60% of the overall area of the laminate.

Other and further objects of the present invention will become apparent to those skilled in the art upon a study of the following specification, and appended claims.

In accordance with the preferred modification of the present invention, a laminate is prepared utilizing copper as the metal and stress oriented polyethyleneterephthalate as the insulating substrate. The copper may range in thickness from about ½ ounce to about 3 ounces (per ft.²) copper, and the stress oriented polyethyleneterephthalate may range in thickness from between about ½ mil and 5 mils. Stress oriented polyethyleneterephthalate is available commercially under the code name "Mylar" from the E. I. Du Pont de Nemours & Company of Wilmington, Delaware. The particular combination of materials as set forth hereinabove has found specific application in the preparation of flexible printed wiring, and any of these combinations of materials has been found to be specifically well adapted for such uses.

In order to form the bond between the copper and the stress oriented polyethyleneterephthalate, it has been found that a polyester resin is normally advantageously utilized. These polyester resins will normally contain an aliphatic acid such as sebacic acid, together with an aromatic acid selected from the group consisting of terepthalalic acid, isophthalic acid, or mixtures thereof. The ratio of aromatic acid to aliphatic acid in the finished ester product is preferably in the range of about 55 weight percent to about 45 weight percent. This material is reacted with an aliphatic glycol containing between about 2 and 10 carbon atoms. The linear aliphatic acid, while preferably being sebacic acid, may be any linear aliphatic acid containing from between about 6 carbon atoms and 10 carbon atoms. Polyester resins of these types are readily commercially available.

The flame retardant material which is utilized in the adhesive consists of a mixture of antimony trioxide and a chlorine donor, the chlorine donor being capable of forming antimony oxychloride when in a flame environment. Chlorine donors which are preferably used are preferably selected from a group of chlorine donors consisting of perchloropentacyclodecane and a highly chlorinated paraffin hydrocarbon having a chain length between about 16 and 40 and containing about 60% of chlorine. The perchloropentacyclodecane is prepared as the reaction product of hexachlorocyclopentadiene with aluminum chloride in the presence of heat. This material forms a reaction product having 78% by weight of chlorine, of which about 65% by weight is actively combined in the product. This particular perchlorination prevents the evolution of heat induced hydrogen chloride gas and promotes the evolution of chlorine in lieu thereof. The evolution of chlorine reacts in a synergistic fashion with antimony oxide to form antimony oxychloride and effective flame retardant. The highly chlorinated paraffins have a chain length of between about 16 and 40, preferably in the range from about 30, and contain from about 60 to about 70% of chlorine. These materials are preferred for their effectiveness in splitting off chlorine rather than hydrogen chloride, particularly when chlorinated to a range in excess of about 60% and up to about 70%. Chlorine donors of this type are commercially available.

In order to prepare an effective adhesive, the mixtures normally should contain between about 50 and 70% of resinous adhesive material or constituent, balance flame retardant constituent. If significantly more flame retardant substance is present in the polyester resin adhesive, the adhesive properties and capabilities will be adversely affected, while if less than about 35% by weight of flame retardant substance is present, the flame retardant capability of the system will be adversely affected. It has been found, however, that mixtures between these ranges will form a particularly useful laminate structure which has particular application to electrical laminates.

In one specific embodiment, an adhesive was prepared utilizing the following ingredients:

TABLE I

| Constituent: | Percent by weight |
| --- | --- |
| Polyester resin | 62.9 |
| Perchloropentacyclodecane | 23.5 |
| Antimony trioxide | 7.5 |
| Polyisocyanate curing agent | 5.6 |

The polyester resin contained a ratio of 55% by weight of polyethyleneterephthalate and 45% by weight of polyethylene sebacate. The curing agent which is utilized in The flame retardant composition coated on polyester film may also be used to coat wire if desired, such as on a helically wound basis with the film disposed or arranged adjacent the wire surface.

In order to achieve the desired synergistic effect between the chlorine donor and the antimony trioxide, ratios of from between about 2:1 and up to about 3:1 by weight of chlorine donor to antimony trioxide may be used. Again, it is this range which has been found to provide the desirable electrical properties in the finished laminate.

As indicated previously, the flame retardant material should preferably be present in an amount ranging from between about 22% up to about 50% by weight of the adhesive solids. While this range is to be preferred, it has been found that the most beneficial effects are obtained when this ratio of flame retardant material ranges from between about 25% and up to about 35%, with the preferred range being about 35%.

It will be appreciated that these specific examples are provided for purposes of illustration only, and those skilled in the art may depart from these specific examples actually departing from the spirit and scope of the present invention.

We claim:
1. Printed wiring means comprising an insulating substrate having a layer of copper arranged in a circuitry pattern bonded to a major surface thereof and covering from about 30% up to about 60% of the surface of the substrate, the bonding being accomplished by means of a film of a flame retardant adhesive, said adhesive film comprising:
  (a) a polyester resinous adhesive constituent, and
  (b) a flame retardant constituent which consists essentially of a combination of antimony trioxide and a chlorine donor, the flame retardant constituent being included in the adhesive in an amount equal to from between about 22% and up to about 50% by weight, with the antimony trioxide portion thereof being from about ⅓ to ¼ of the flame retardant constituent, said chlorine donor being selected from the group consisting of perchloropentacyclodecane and a highly chlorinated paraffin containing between about 60% and 70% of reactive chlorine, and hav- weight, with the antimony trioxide portion thereof being from about ⅓ to ¼ of the flame retardant constituent, said chlorine donor being selected from the group consisting of perchloropentacyclodecane and about 60% and 70% of reactive chlorine, and having an average chain length from between about 16 carbon atoms and 50 carbon atoms.

References Cited

UNITED STATES PATENTS

| | | | |
|---|---|---|---|
| 2,480,298 | 8/1949 | Happoldt | 161—403 X |
| 2,514,141 | 7/1950 | Phillips | 260—40 |
| 2,590,211 | 3/1952 | Rugar | 106—15 |
| 2,783,215 | 8/1956 | Robitschek et al. | 260—45.4 |
| 2,924,532 | 2/1960 | Dereich | 106—15 |
| 3,031,425 | 4/1962 | Schoepfle | 260—28.5 |
| 3,186,898 | 6/1965 | Melink | 161—214 |

ROBERT F. BURNETT, Primary Examiner

R. L. MAY, Assistant Examiner

U.S. Cl. X.R.

161—214, 403

UNITED STATES PATENT OFFICE
CERTIFICATE OF CORRECTION

Patent No. 3,534,147　　　　　　　　　　　　　　　　October 13, 1970

Francis H. Bratton et al.

It is certified that error appears in the above identified patent and that said Letters Patent are hereby corrected as shown below:

Column 5, line 4, after "and" insert -- a highly chlorinated paraffin containing between --.

Signed and sealed this 6th day of April 1971.

(SEAL)
Attest:

EDWARD M. FLETCHER, JR.　　　　　　　　WILLIAM E. SCHUYLER, JR.
Attesting Officer　　　　　　　　　　　Commissioner of Patents